W. C. HAESE.
TRACK SANDER SPOUT.
APPLICATION FILED JAN. 13, 1916.
Reissued Apr. 4, 1916. 14,099.
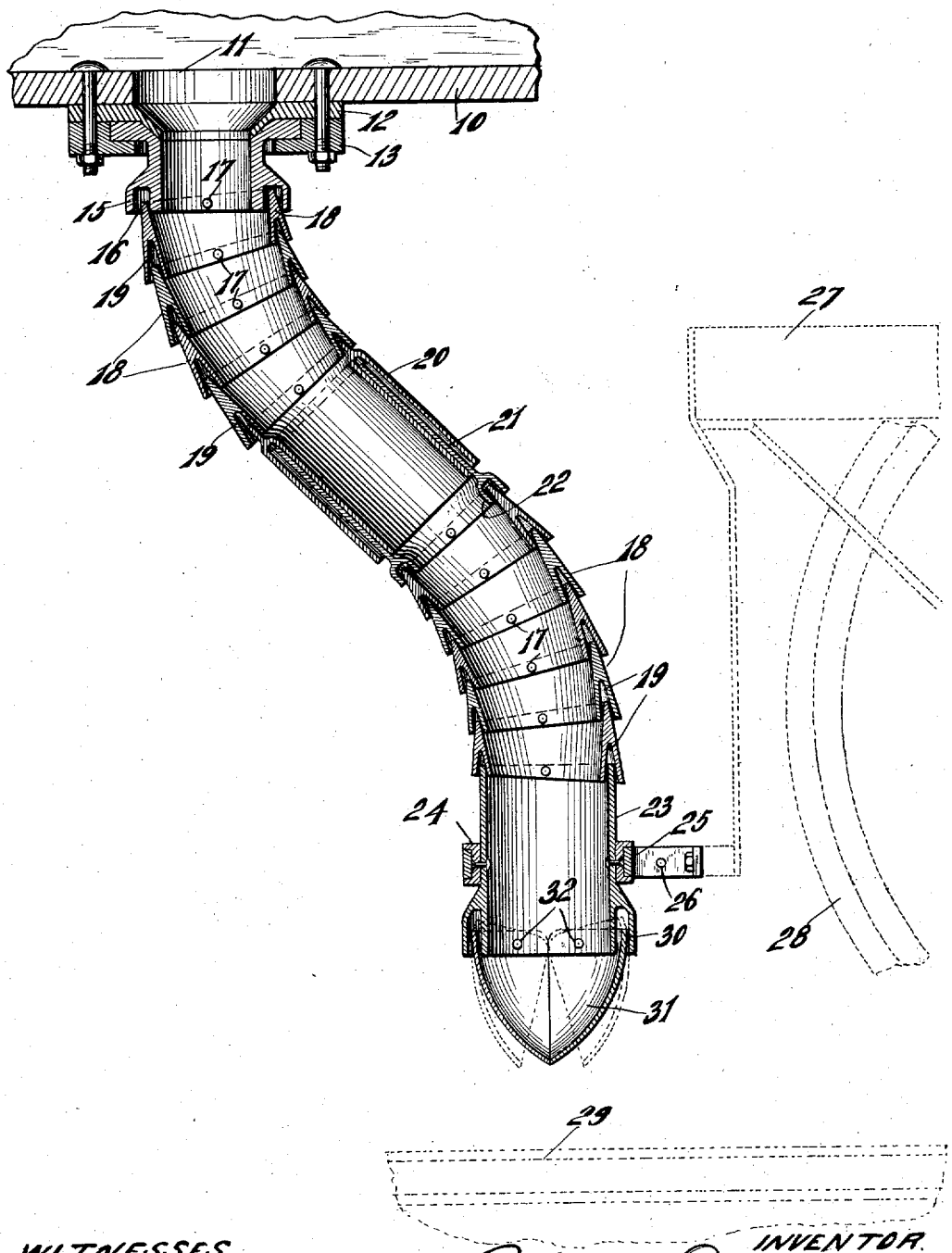
WITNESSES.
Thomas
Katherine Holt
INVENTOR.
William C. Haese
By R. S. Caldwell
ATTORNEY.
THE COLUMBIA PLANOGRAPH CO., WASHINGTON, D. C.

UNITED STATES PATENT OFFICE.

WILLIAM C. HAESE, OF MILWAUKEE, WISCONSIN.

TRACK-SANDER SPOUT.

14,099. Specification of Reissued Letters Patent. Reissued Apr. 4, 1916.

Original No. 1,143,824, dated June 22, 1915, Serial No. 875,779. Application for reissue filed January 13, 1916. Serial No. 71,981.

*To all whom it may concern:*

Be it known that I, WILLIAM C. HAESE, a citizen of the United States, and resident of Milwaukee, in the county of Milwaukee and State of Wisconsin, have invented new and useful Improvements in Track-Sander Spouts, of which the following is a description, reference being had to the accompanying drawings, which are a part of this specification.

This invention has for its object to provide a spout for track sanders of electric railway cars or the like which will be flexible and extensible and capable of turning to permit its lower end to be held in a fixed position close to and in front of the car wheels, while its upper end is attached to the car body in communication with the sand hopper.

Another object of the invention is to provide such a spout for track sanders which may be constructed of metal so as to be more durable and efficient and consisting of articulating segments with each segment overlapping the edge of the next segment below, both inside and outside of the spout so as to shed the sand traveling through the interior of the spout and so as to shed water and snow on the outside of the spout.

Another object of the invention is to provide a track sander spout with telescoping tubular sections to permit of expansion and contraction of the spout to increase and diminish the length thereof as may be required when the car truck turns as the car rounds a curve, the upper telescoping tubular section being double-walled to form an annular space between the walls open at its lower edge and containing the telescoping portion of the lower section whereby the telescoping action may take place without exposing the upper edge of the lower section to the flowing sand within the spout or to water or dirt on the outside of the spout.

Another object of the invention is to further protect the spout against freezing by providing self closing lips at its discharge end that will prevent the introduction of snow or the like.

With the above and other objects in view the invention consists in the track sander spout as herein claimed and all equivalents.

Referring to the accompanying drawing the figure constitutes a central sectional view of a track sander spout constructed in accordance with this invention.

In this drawing 10 represents the floor of the car body containing a sand box or hopper, not shown, with an opening 11 through the floor through which the sand is discharged, as by a blast of compressed air as usual. A funnel-shaped plate 12 surrounds the opening 11, and between it and a flanged ring 13 is mounted a flanged tubular swivel section 14 capable of turning on its axis and having the tapering portion of the funnel entering the flaring upper end thereof so that sand passing through the opening 11 is guided by the funnel to the bore of the swivel section 14. A flange 15 surrounds the lower end of the tubular swivel section 14 and is spaced therefrom to form an annular groove 16 within which at diametrically opposite points are pivot pins 17 pivotally connecting the upper edge of a sector-shaped tubular section 18 having side walls of an inverted V-shape in cross section. The inner and outer diverging tubular flanges of the section 18 form between them an annular groove 19 to receive the upper edge of another tubular section of similar construction, and so on throughout a series of tubular sections similarly positioned with their corresponding parts alined so as to produce a curvature or bend and form a flexible elbow, the pivot connections 17 being in alinement along the opposite sides of the bend. The play of each tubular section in the groove of the section thereabove enables the angularity of the bend to be greater or less without disturbing the tubular form of the elbow and without opening the joints.

The spout is preferably composed of two flexible elbows reversely bent and connected by an intermediate telescoping section comprising an upper tubular member 20 with a single edge at its upper end pivotally connected in the groove of the lowermost section of the upper elbow and with its lower end formed of concentric tubular parts spaced apart to receive the lower tubular member 21 which has a telescoping fit therebetween and has a pair of concentric diverging flanges 22 at its lower end to receive the upper edge of the uppermost section of the lower elbow.

The lowermost section of the lower elbow comprises a tubular member 23 surrounded by a flanged collar 24 secured thereto and swivelly mounted in a ring 25 on a bracket 26 carried in any suitable manner by the truck 27 of the car directly in front of the car wheel 28 and terminating a short distance above the rail 29. At the lower end of the tubular member 23 there is an annular flange 30 concentric therewith and spaced therefrom to form a comparatively deep annular groove in which are pivotally mounted a pair of curved lip members 31, the pivot points 32 thereof being so positioned relative to the center of gravity of the lip members as to cause said member to normally hang in a closed position, as shown, but permitting of their swinging away from each other under the weight of sand discharged through the spout, as shown by dotted lines, and then serving to spread the sand over the head of the rail 29.

By means of this invention the sand from the sand box is conducted through an all metal spout to a point close to the rail and directly in front of the car wheel, and this, irrespective of the direction of travel of the car, that is to say, the point of delivery remains the same when the car body is shifted relative to the car truck on turning curves and when the car is traveling on a straight track.

The vertical and horizontal swinging movements of the car body with relation to the truck in no way affect the operation of the discharge spout, for the lower member thereof remains in its fixed position and the change in position of the upper member is permitted by the telescoping of the members 20 and 21, the pivotal movements of all members in their connection with each other and the swivel movements of the members 14 and 23. Not only are all of the surfaces so related as to avoid the formation of pockets or ledges within the spout for holding sand or retarding its flow, but on the exterior of the spout they are so overlapped as to shed water and prevent the parts freezing. Also, the automatically closing swinging lip members 31 prevent the spout becoming clogged with sand and ice, so that the device will remain operative at all times, and being constructed of metal it will be durable and not liable to injury.

It is obvious that the extensible telescoping tubular section may be used with other forms of flexible connecting means corresponding with the flexible elbows and in such cases the connections of its members with the flexible connecting members will be modified to suit the requirements. In such cases the advantages due to the extension and contraction of the spout by reason of the telescoping fit of the section will be present as also the advantages due to the double-wall structure thereof preventing the lodgment of sand within the spout interfering with the telescoping operation and shedding water on the outside to prevent freezing interfering with such telescoping action.

What I claim as new and desire to secure by Letters Patent is:

1. A spout for track sanders, comprising a flexible tube formed of sections pivotally connected together, each section having a groove in its lower edge receiving the upper edge of the section therebeneath, means on the uppermost section for connection with a car body, and means on the lowermost section for connection with a car truck.

2. A spout for track sanders, comprising a flexible tube formed of sections pivotally connected together, each section having its side walls of V-shape in cross section with its single edge pivotally connected between the double edge of the section thereabove, means on the uppermost section for connection with a car body, and means on the lowermost section for connection with a car truck.

3. A track sander spout, comprising a pair of oppositely curved flexible elbows connected with the car body and the car truck respectively, each elbow being formed of sector-shaped tubular members pivotally connected together, the upper single edge of each member fitting between a pair of lower divergent edges of the member thereabove, and means for connecting the elbows together.

4. A spout for track sanders, comprising a pair of flexible tubular elbows connected respectively to a car body and a car truck, each elbow comprising a series of sector-shaped tubular members pivotally connected together, each member having a single upper edge and a pair of divergent flanges for the lower edge forming an annular groove between them and each member having its upper edge pivotally connected within the annular groove of the member thereabove, a tubular member having its upper edge pivotally connected in the annular groove of the lowermost member of the upper elbow and having an inner and an outer wall with an annular space between them, and a tubular member slidably fitting within said annular space and having an annular groove at its lower end within which is pivotally connected the upper edge of the uppermost member of the lower elbow.

5. A spout for track sanders, comprising a funnel plate, a flanged ring secured thereto, a flanged swivel member fitting between the funnel-plate and the flanged ring and capable of turning, said swivel member having an annular groove at its lower edge, a flexible elbow of articulated interfitting members having tongued and grooved upper and lower edges respectively, a similar flexible elbow having telescoping connection with the first mentioned flexible elbow, a tubular member at the lower end of the second flexible elbow, a flanged collar thereon, a ring within which the flanged collar is swivelly mounted and adapted for connection with a car truck, said tubular member having an annular groove at its lower edge, and curved lip members pivotally mounted within the annular groove and normally engaging each other to close the end of the spout but opening by the weight of the sand to distribute the sand on the rail.

6. A spout for track sanders, comprising a pair of flexible tubular elbows connected respectively to a car body and a car truck, a tubular member having its upper end connected to the upper elbow and having an inner and an outer wall with an annular space between them, and a tubular member slidably fitting within said annular space and connected with the lower elbow.

7. In a track sander spout, a telescoping section comprising upper and lower tubular members having connection with the car body and the car truck respectively, the upper member having an inner and an outer wall with an annular space between them and the lower member slidably fitting in said annular space with its upper edge protected by said inner wall from the flow of sand within the spout and protected by said outer wall from water on the outside of the spout.

8. In a track sander spout having connection with a car body and a car truck respectively, a tubular member at the lower end of the spout having an annular groove at its lower edge, and curved lip members pivotally mounted within the annular groove and normally engaging each other to close the end of the spout but opening under the weight of the sand to distribute the sand on the rail.

In testimony whereof, I affix my signature, in presence of two witnesses.

WILLIAM C. HAESE.

Witnesses:
R. S. C. CALDWELL,
KATHERINE HOLT.

Copies of this patent may be obtained for five cents each, by addressing the "Commissioner of Patents, Washington, D. C."